Oct. 22, 1968 J. BUHR 3,407,360

NETWORKS FOR SELECTIVELY AMPLIFYING CERTAIN FREQUENCIES MORE SO THAN OTHER FREQUENCIES

Filed Aug. 10, 1966 2 Sheets-Sheet 1

INVENTOR.
JACOB BUHR

BY

PATENT AGENT

NETWORKS FOR SELECTIVELY AMPLIFYING CERTAIN FREQUENCIES MORE SO THAN OTHER FREQUENCIES

Filed Aug. 10, 1966 2 Sheets-Sheet 2

INVENTOR.
JACOB BUHR
BY
PATENT AGENT

United States Patent Office 3,407,360
Patented Oct. 22, 1968

3,407,360

NETWORKS FOR SELECTIVELY AMPLIFYING CERTAIN FREQUENCIES MORE SO THAN OTHER FREQUENCIES

Jacob Buhr, Kitchener, Ontario, Canada, assignor to Electrohome Limited

Filed Aug. 10, 1966, Ser. No. 571,635
8 Claims. (Cl. 330—29)

ABSTRACT OF THE DISCLOSURE

The response curve of an amplifying device having three electrodes with two resistors connected to two different electrodes thereof is made variable by either a series resonant circuit including a variable resistor adapted to be switched in shunt with one of the aforementioned resistors or by means of series circuits each including a resistor and a capacitor adapted to be switched in shunt selectively or together with the aforementioned resistors.

This invention relates to networks for selectively amplifying certain frequencies more so than other frequencies, i.e., to presence control networks.

It is often desirable to provide monaural or stereophonic sets with a presence control. Such a control may be operated by the listener to permit the listener to hear certain frequencies, say voice frequencies, amplified to a greater extent than other frequencies, say those produced by the instruments of an orchestra accompanying a vocalist.

In accordance with this invention there are provided presence control networks which achieve the foregoing result but which are relatively simple and inexpensive.

In preferred embodiments of this invention, it is possible for the listener to select different frequencies for increased amplification, in contrast to many prior art presence control networks wherein only one band of frequencies that is determined by the manufacturer can be amplified more so than others.

A presence control network embodying this invention includes an amplifying device, which may be either a transistor or an electron discharge device. Assuming the amplifying device to be a transistor, resistors are connected in the emitter and collector circuits thereof, while input signals to be amplified are applied to the base electrode thereof. To a first approximation the gain of such a stage is given by Z1/Z2, where Z1 is the impedance in the collector circuit and Z2 is the impedance in the emitter circuit. In one embodiment of this invention, a series resonant circuit is adapted to be connected in parallel through a switch with the emitter resistor or a part thereof, thereby decreasing the impedance in the emitter circuit at the resonant frequency of the series resonant circuit, thus increasing the gain of the stage at this frequency. Preferably a plurality of series resonant circuits are provided, all being resonant at different frequencies, so that different frequencies may be amplified selectively.

In another embodiment of this invention, switches are provided to connect series circuits, each consisting of a resistor and a capacitor, in parallel with the collector and emitter circuit resistors. By closing one or the other or both switches, one can obtain different amplifier response curves.

This invention will become more apparent from the following detailed description, taken in conjunction with the appended drawings, in which.

Figures 1, 2, 3, 4:
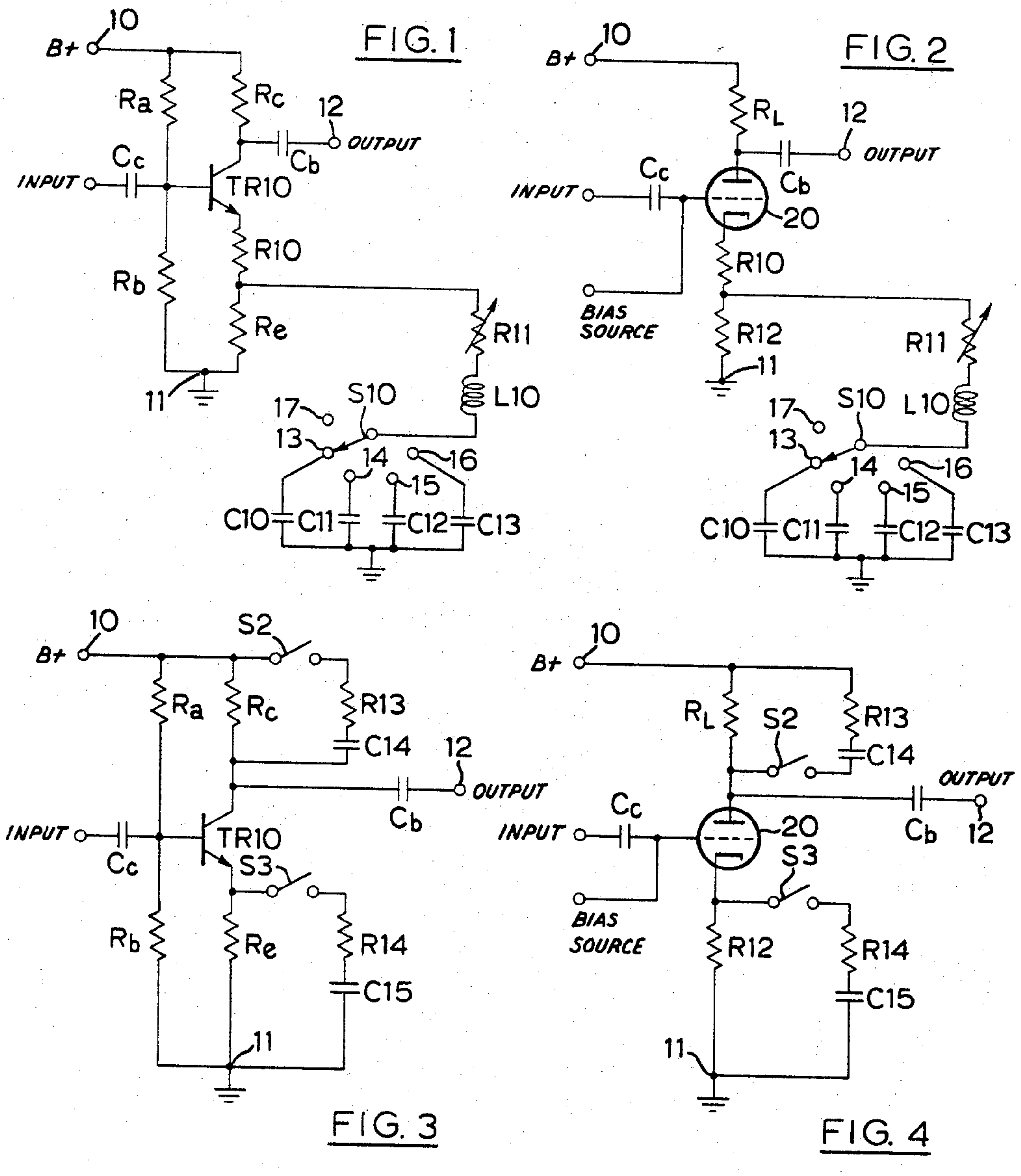
FIGURE 1 shows a transistor network embodying this invention.
FIGURE 2 is the same network as shown in FIGURE 1 but with an electron discharge device replacing the transistor.
FIGURES 3 and 4 show another network embodying this invention using a transistor and an electron discharge device respectively.

Referring to FIGURE 1, input signals to be amplified are applied to the base electrode of a transistor TR10 via a coupling capacitor $C_c$. This transistor is biased on via resistors $R_a$ and $R_b$ that are connected in series circuit between two terminals 10 and 11 at different D.C. potentials, namely B+ and ground respectively, the common terminal of resistors $R_a$ and $R_b$ being connected to the base electrode of transistor TR10.

A resistor $R_c$ is connected between terminal 10 and the collector electrode of transistor TR10, while resistors R10 and $R_e$ are connected in series with each other between terminal 11 and the emitter electrode of transistor TR10.

Output signals are derived from a terminal 12 connected to the common terminal of resistor $R_c$ and the collector electrode of transistor TR10 by a blocking or coupling capacitor $C_b$.

Adapted to be connected in parallel with resistor $R_e$ by means of a switch S10 are a plurality of series resonant circuits each resonant at a different frequency. Common to each series resonant circuit is a variable resistor R11 and an inductance coil L10. In the embodiment of the invention shown there are four capacitors C10, C11, C12 and C13 each having a different capacitance value, so four different series resonant circuits each including a different one of capacitors C10–C13 can be selected depending upon the position of switch S10. As shown, one terminal of each of capacitors C10–C13 is connected to ground, i.e., to terminal 11, while the other terminals of capacitors C10–C13 are connected to switch contacts 13, 14, 15 and 16 respectively. A contact 17 for "switch open" is provided.

Resistor R10 performs a current limiting function at resonance and could be located in the series resonant circuit shunting resistor $R_e$, if desired. Off resonance, resistor R10 and resistors $R_c$ and $R_e$ determine the minimum gain.

The network of FIGURE 2 is very similar to the network of FIGURE 1, the basic difference being the substitution of an electron discharge device 20 in the form of a triode for transistor TR10. Otherwise the networks are the same except for the manner of applying bias to the grid electrode of triode 20. To differentiate plate resistor $R_L$ from collector resistor $R_c$ and cathode resistor R12 from emitter resistor $R_e$, different symbols have been used, otherwise the same symbols have been used in FIGURES 1 and 2 to designate the same components, as is the case in respect of FIGURES 1 and 3 and FIGURES 2 and 4.

The network of FIGURE 3 differs from the network of FIGURE 1 in that switch S10 has been omitted as well as all series resonant circuits. In place thereof there is provided a series circuit consisting of a resistor R13 and a capacitor C14 which is adapted to be connected in parallel with resistor $R_c$ when a switch S2 is closed, and a series circuit consisting of a resistor R14 and a capacitor C15 which is adapted to be connected in parallel with resistor $R_e$ when a switch S3 is closed.

The network of FIGURE 4 differs from that of FIGURE 2 in the same way that the networks of FIGURES 1 and 3 differ from each other.

The operation of the network shown in FIGURE 1 now will be discussed. When switch S10 is on contact 17, there is no series resonant circuit shunting resistor $R_e$. Under these circumstances, provided that $h_{21}(R_e+R10) >> h_{11}$, the gain of the stage is approximately equal to the ratio of Z1 to Z2. This also is true with switch S10 on any contacts 13, 14, 15 or 16. In this latter case $$Z1=R_c \quad (1)$$

and $$Z2=R10+\frac{R_e\left(R11+j\omega L10-\frac{j}{\omega_c}\right)}{R_e+R11+jL10-\frac{j}{\omega_c}} \quad (2)$$

C=C10, C11, C12 or C13
R11 includes the resistance of coil L10
At resonance $$Z2=R10+\frac{R_eR11}{R_e+R11} \quad (3)$$

Well off resonance $$Z2\approx R10+R_e \quad (4)$$

Thus, as may be seen by reference to Equations 1 and 4, and the fact that $$\text{Gain}\approx Z1/Z2 \quad (5)$$

at frequencies well of resonance, the response curve of the amplifier will be flat and is given by the formula $$\text{Gain}\approx\frac{R_c}{R10+R_e} \quad (6)$$

Figure 5:
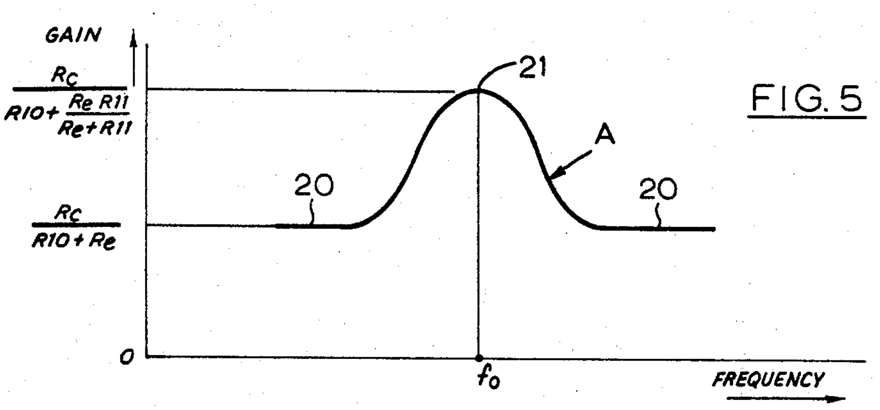
FIGURES 5–8 are amplifier response curves (not to scale), FIGURE 5 being the response curve of the circuit of FIGURE 1, and FIGURES 6–8 being three of the different response curves which can be obtained with the circuit of FIGURE 3.

At these frequences the response is indicated by portions 20 of curve A of FIGURE 5.

However, when it is desired to amplify a certain frequency $f_0$ more so than other frequencies, switch S10 may be moved to the position shown in FIGURE 1 where it engages contact 13, thus placing a series resonant circuit consisting of resistor R11, inductance coil L10 and capacitor C10 in parallel with resistor $R_e$. This series resonant circuit is resonant at frequency $f_0$ and has a low impedance at its resonant frequency. Under these conditions, the gain of the amplifier at resonance is given by the following equation:

$$\text{Gain}\approx\frac{R_c}{R10+\frac{R_eR11}{R_e+R11}} \quad (7)$$

Equation 7 determines the response at $f_0$, i.e., the gain at point 21 of curve A of FIGURE 5. By varying resistor R11, one can vary the gain $f_0$, i.e., the vertical position of point 21. If resistor R11 is set to zero, resistor R10 then controls the maximum increase in gain that can be achieved at the desired frequency $f_0$. The effect of the series resonant circuit being placed in parallel with resistor $R_e$ is, as aforementioned, to decrease Z2, thereby increasing the gain of the amplifier at series resonant frequency $f_0$. Bandwidth is controlled by the choice of L10, C10–C13, $R_c$, $R_e$, R10 and R11.

By moving switch S10 to contact different contacts 14, 15 and 16, the peak in the response curve of the amplifier can be made to occur at different frequencies $f_{01}$, $f_{02}$, $f_{03}$ corresponding to the resonant frequencies of the three different series resonant circuits that are completed when switch S10 engages contacts 14, 15 and 16 respectively. In this way voice frequencies or different musical instruments may be emphasized.

The operation of the network shown in FIGURE 2 will be immediately apparent from the operation of the network of FIGURE 1 as described above.

The operation of the network of FIGURE 3 now will be described.

When both switches S2 and S3 are open, provided that $h_{21}R_e>>h_{11}$, $$\text{Gain}\approx\frac{Z1}{Z2}=\frac{R_c}{R_e} \quad (8)$$

(Z1 is the impedance of the collector circuit. Z2 is the impedance of the emitter circuit). In other words, the amplifier will have a flat response curve over a particular frequency range.

Figure 6:
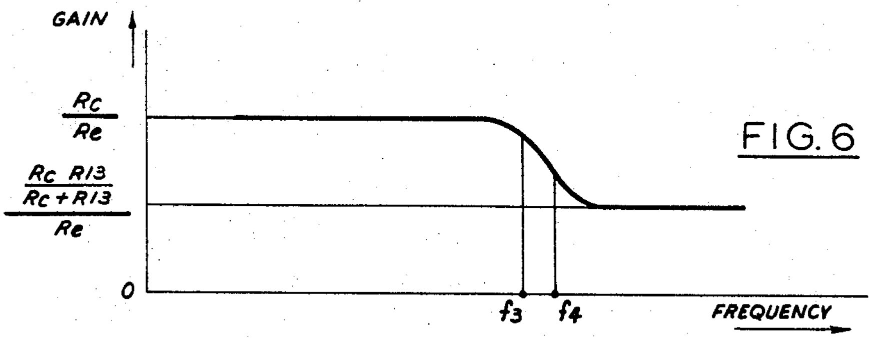

When switch S2 is closed but switch S3 is kept open, the series circuit consisting of resistor R13 and capacitor C14 is connected in parallel with resistor $R_c$. Because of the fact that the impedance of capacitor C14 decreases with increasing frequency, and because the gain of the stage to to a first approximation given by the ratio of Z1 to Z2, the response curve of the amplifier will be as shown in FIGURE 6, the response being higher at lower frequencies than at higher frequencies. This may be seen more clearly from the fact that at low frequencies when the impedance of capacitor C14 is high $$\text{Gain}\approx R_c/R_e \quad (9)$$

At higher frequencies, however the gain falls off to $$\frac{\frac{R_cR13}{R_c+R13}}{R_e} \quad (10)$$

the general gain equation being as follows:

$$\text{Gain}=\frac{\frac{R_c\sqrt{R13^2\omega^2C14^2+1}}{\sqrt{(R_c+R13)^2\omega^2C14^2+1}}}{R_e} \quad (11)$$

The response curve of the amplifier with switch S2 closed and switch S3 open is shown in FIGURE 6, as aforementioned. The frequency $f_3$ where the gain is 3 db below the maximum gain and the frequency $f_4$ where the gain is 3 db above the gain given by Formula 10 may be calculated readily in terms of the size of capacitor C14 required. The manner of calculation will become apparent after consideration of the operation of the circuit with switch S2 open and switch S3 closed.

Figure 7:
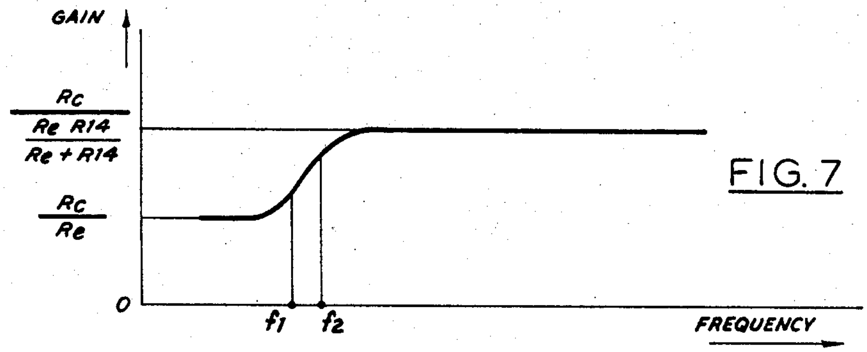

When switch S3 is closed but switch S2 kept open, a series circuit consisting of resistor R14 and capacitor C15 is connected in parallel with resistor $R_e$. With switch S3 closed and switch S2 open, the response curve of the amplifier will be shown in FIGURE 7, this being on account of the decreasing impdeance of capacitor C15 with increasing frequency, and the fact that the gain of the stage is appproximately given by the ratio of Z1 to Z2. Under these circumstances, the amplifier has a higher gain for higher frequencies than it does for lower frequencies. This may be seen from the fact that at low frequencies when the impedance of capacitor C15 is high, $$\text{Gain}\approx R_c/R_e \quad (12)$$

At higher frequencies, however, the gain rises to $$\frac{R_c}{\frac{R_eR14}{R_e+R14}} \quad (13)$$

the general gain equation being as follows:

$$\text{Gain}=\frac{R_c}{\frac{R_e\sqrt{R14^2\omega^2C15^2+1}}{\sqrt{(R_e+R14)^2\omega^2C15^2+1}}} \quad (14)$$

The frequency $f_2$ at which the gain is down 3 db from the maximum gain may be determined by equating the ratio of (13) and (14) to $\sqrt{2}$ and solving for $\omega$ C15. Since $\omega$ is set by design requirements, the value of capacitor C15 can be found in terms of the required frequency $f_2$ where the gain is down 3 db from maximum. Once the value of capacitor C15 is established, the frequency $f_1$ at which the gain is 3 db above the minimum given by Equation 12 can be determined.

Obviously the initial gain and the increase in gain are determined by the values of $R_c$, $R_e$ and R14.

Figure 8:
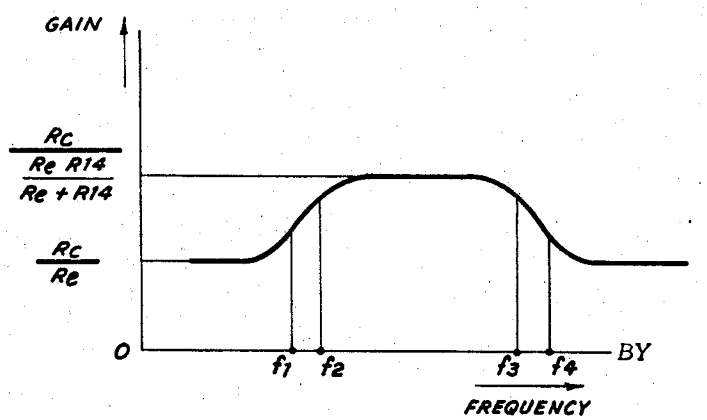

With both switches S2 and S3 closed, and with $$\frac{R_c}{R_e}=\frac{R13}{R14}$$

the latter condition resulting from the requirement that at the upper and lower frequency limits the gain must be the same, the response curve of the amplifier will be as shown in FIGURE 8.

At low and high frequencies the gain is approximately $R_c/R_e$. At frequencies between $f_2$ and $f_3$, assuming $f_3$ is chosen to be greater than $f_2$, and after a level response has been obtained, the gain reaches a maximum of approximately $$\frac{R_c}{\frac{R_eR14}{R_e+R14}}$$

The gain increase from $R_c/R_e$ to its maximum is due to a decrease in emitter circuit impedance. After the maximum gain is reached, emitter circuit impedance changes cease to be significant and the decrease in gain to the original gain of $R_c/R_e$ is attributable to decreasing collector circuit impedance.

It will be seen that depending upon the position of switches S2 and S3, four different amplifier response curves can be obtained.

The operation of the network of FIGURE 4 will be immediately apparent from the description of the operation of the network of FIGURE 3.

In respect of the networks of FIGURES 2 and 4, with the various switches open it should be understood that $$\text{Gain}\approx\frac{R_L}{R10+R12} \qquad \text{(FIG. 2)}$$

or $$R_L/R12 \qquad \text{(FIG. 4)}$$

if $$(\mu+1)(R10+R12)\gg rp+R_L \qquad \text{(FIG. 2)}$$

or $$(\mu+1)R12\gg rp+R_L \qquad \text{(FIG. 4)}$$

If these conditions do not hold, the effect of $\mu$ and $rp$ must be included in the overall design.

While preferred embodiments of this invention have been disclosed, those skilled in the art will appreciate that changes and modifications may be made therein without departing from the spirit and scope of this invention as defined in the appended claims.

I claim:

1. A network for selectively amplifying certain frequencies more than other frequencies comprising: an amplifying device having first, second and third electrodes; means for applying an input signal to be amplified by said amplifying device to said first electrode; a first resistor connected in series circuit between said second electrode and a first terminal at a first D.C. potential; a second resistor connected in series circuit between said third electrode and a second terminal at a second D.C. potential different from said first D.C. potential; means connected to said second electrode for deriving an output signal from said network; a switch; and a series resonant circuit adapted to be connected in parallel with said second resistor when said switch is closed and comprising a variable resistor, an inductance coil and a capacitor.

2. A network according to claim 1, wherein said amplifying device is a transistor having base, collector and emitter electrodes, said first electrode being said base electrode, said second electrode being said collector electrode, said third electrode being said emitter electrode.

3. A network according to claim 1, wherein said amplifying device is an electron discharge device having plate, cathode and grid electrodes, said first electrode being said grid electrode, said second electrode being said plate electrode, said third electrode being said cathode electrode.

4. A network according to claim 1, wherein there are a plurality of said capacitors, said capacitors having different capacitance values, said switch being operable to select different ones of said capacitors for inclusion in said series resonant circuit, whereby series resonant circuits resonant at different frequencies may be connected in parallel with said second resistor.

5. A network for selectively amplifying certain frequencies more than other frequencies comprising: an amplifying device having first, second and third electrodes; means for applying an input signal to be amplified by said amplifying device to said first electrode; a first resistor connected in series circuit between said second electrode and a first terminal at a first D.C. potential; a second resistor connected in series circuit between said third electrode and a second terminal at a second D.C. potential different from said first D.C. potential; means connected to said second electrode for deriving an output signal from said network; a first switch; a first series circuit adapted to be connected in parallel with said first resistor when said first switch is closed and comprising a third resistor and a first capacitor; a second switch; and a second series circuit adapted to be connected in parallel with said second resistor when said second switch is closed and comprising a fourth resistor and a second capacitor.

6. A network according to claim 5, wherein said amplifying device is a transistor having base, collector and emitter electrodes, said first electrode being said base electrode, said second electrode being said collector electrode, said third electrode being said emitter electrode.

7. A network according to claim 5, wherein said amplifying device is an electron discharge device having plate, cathode and grid electrodes, said first electrode being said grid electrode, said second electrode being said plate electrode, said third electrode being said cathode electrode.

8. A network according to claim 6, wherein the ratio of the resistance of said first resistor to the resistance of said second resistor is equal to the ratio of the resistance of said third resistor to the resistance of said fourth resistor.

References Cited

UNITED STATES PATENTS

| | | | |
|---|---|---|---|
| 2,514,112 | 7/1950 | Wright et al. | 330—94 X |
| 2,889,455 | 6/1959 | Druz | 330—94 X |
| 3,054,969 | 9/1962 | Harrison | 330—31 X |
| 3,209,164 | 9/1965 | DeWitt | 330—94 X |

FOREIGN PATENTS

| | | |
|---|---|---|
| 103,979 | 5/1938 | Australia. |
| 746,109 | 3/1956 | Great Britain. |

ROY LAKE, *Primary Examiner.*

J. B. MULLINS, *Assistant Examiner.*